United States Patent [19]
Sakai et al.

[11] Patent Number: 5,353,079
[45] Date of Patent: Oct. 4, 1994

[54] FILM UNIT WITH PHOTOGRAPHIC LENS

[75] Inventors: Zeniti Sakai; Ken Ishida, both of Hino, Japan

[73] Assignee: Konica Corporation, Tokyo, Japan

[21] Appl. No.: 8,164

[22] Filed: Jan. 25, 1993

[30] Foreign Application Priority Data

Jan. 30, 1992 [JP] Japan .................................. 4-15209

[51] Int. Cl.⁵ ...................... G03B 15/03; G03B 15/02
[52] U.S. Cl. .............................. 354/149.11; 354/127.1
[58] Field of Search ........... 354/127.1, 127.11, 127.12, 354/149.11, 288

[56] References Cited

U.S. PATENT DOCUMENTS

Re. 34,168  1/1993  Ohmura et al. ................ 354/145.1
4,954,858  9/1990  Ohmura et al. ................ 354/145.1

Primary Examiner—Michael L. Gellner
Assistant Examiner—Nicholas J. Tuceillo
Attorney, Agent, or Firm—Frishauf, Holtz, Goodman & Woodward

[57] ABSTRACT

In a single use camera in which an unexposed film has been loaded and which is sold together with the unexposed film, the camera comprises a strobe including an electric circuit, to irradiating a subject; and a camera body in which the strobe is incorporated, the camera body provided with a hole through which the function of the strobe can be checked.

2 Claims, 6 Drawing Sheets

FILM UNIT WITH PHOTOGRAPHIC LENS

BACKGROUND OF THE INVENTION

The present invention relates to a film unit with a photographic lens having a strobe unit, which is sometimes referred to as 'a single use camera' and by which a photograph can be taken using an unexposed film previously loaded into the unit.

The film unit with a photographic lens is provided after an unexposed film has been loaded in a camera body, the cost of which is low and the function of which is simple. The camera body is generally provided with a simple photographic lens having a large fixed diaphragm value, a fixed focus and a fixed shutter speed. Sensitivity of the camera is insufficient for general picture taking conditions, and therefore a film having sensitivity higher than ISO sensitivity 320 is commonly used in the camera. However, an underexposed picture is taken in many cases, depending on the photographic scene. Therefore, the film unit with a photographic lens is often provided with a strobe unit.

In original versions of the film unit with a photographic lens, the camera body was disposed of after the film loaded previously in the camera body had been used. Although some parts of the camera were recycled, some were not.

In order to recycle the film unit with a photographic lens, in view of environmental concerns, the film unit which has been used once is now collected again, and after that, its function is checked from the viewpoint of quality assurance in a factory. Then the film unit is reused after non-defective units have been selected. Parts of the collected camera are disassembled, and, for example, the functioning of a disassembled strobe unit, which is an important unit, is checked, and after non-defective parts and defective parts have been separated, the non-defective parts can be recycled. Therefore, thus far only non-defective parts have been deemed recyclable. However, in order to reuse the entire body of the camera, (to reuse almost all of the camera), disassembling of the camera should be avoided.

SUMMARY OF THE INVENTION

The object of the present invention is to provide a film unit with a photographic lens, the function of which can be checked without disassembling of a strobe unit or the like when the film unit is reused.

The object of the present invention can be accomplished by a film unit with a photographic lens in which an unexposed film is previously loaded, and to which a strobe unit is provided, the film unit with a photographic lens comprising a plurality of small holes into which pins for function checking can be inserted from the outside of the film unit so that, at least, the function of a strobe unit can be checked without disassembling the film unit.

Further, the object of the present invention can be accomplished by a film unit with a photographic lens in which an unexposed film is previously loaded, and to which a strobe unit is provided, the film unit with a photographic lens comprising a plurality of small holes into which pins for function checking can be inserted from the outside of the film unit so that inspection of its electric system can be performed by inserting the pins for function checking.

DETAILED DESCRIPTION OF THE PREFERRED EMBODIMENTS

Figure 1:
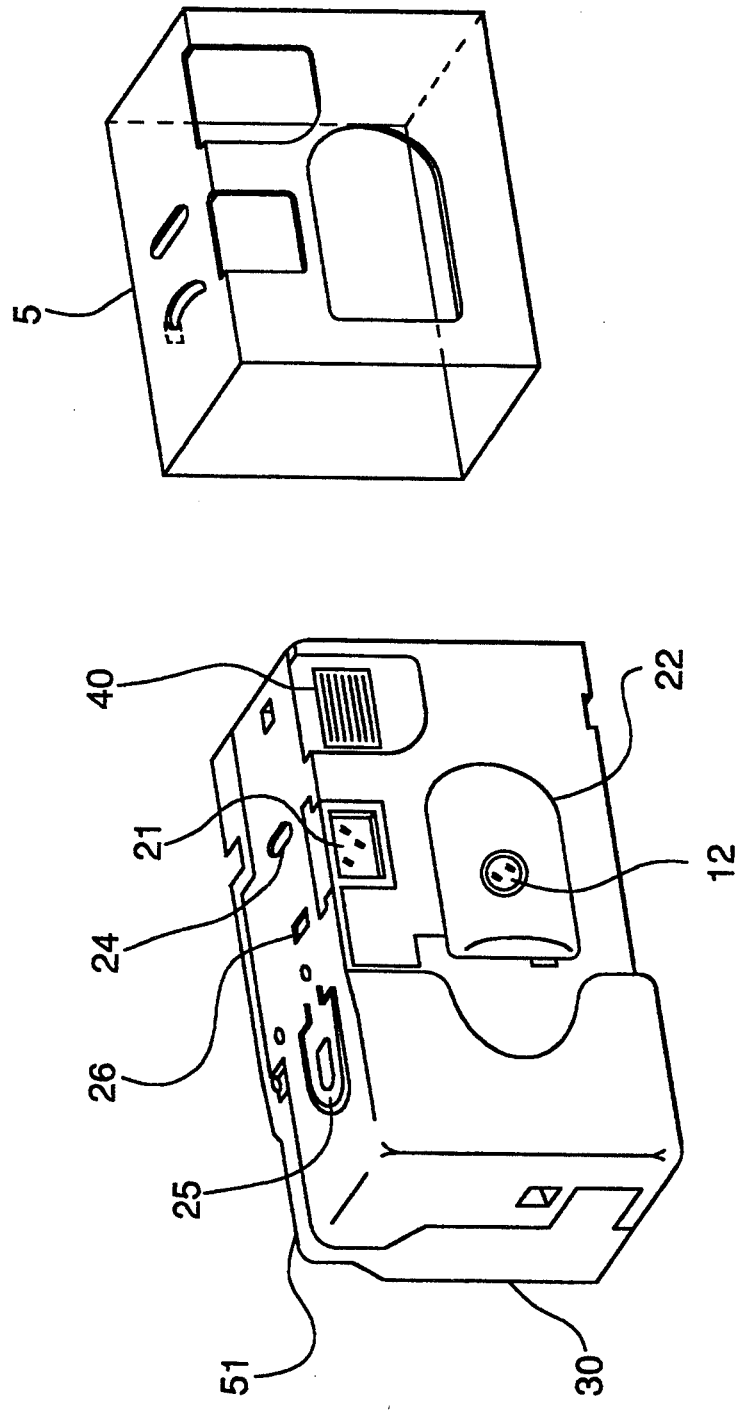
FIG. 1 shows the appearance of the film unit with a photographic lens of the present invention.

FIG. 1 is a view showing the appearance of a film unit with a photographic lens of the present invention. This film unit will be referred to as a camera in this specification, hereinafter. This camera is previously loaded with a 35 mm film roll (J 135) in the manufacturing process. After photographs have been taken, the film roll is not rewound, and the camera with the film is sent to a laboratory to develop and print the film.

More specifically, an unexposed film provided in a film magazine is loaded into the camera of the invention, and then the camera is tightly sealed. The film is then wound around the take-up reel so that all of the photographing frames are in the take-up take chamber. As the film is exposed, the exposed frame is rewound into the film magazine. After all the film has been exposed, the photographer does not need to wind the exposed film into the film magazine. Therefore, the film magazine can be taken out from the camera in a bright room when the film is sent to the laboratory.

The exposed film provided in the film magazine can be easily taken out from the camera when a portion of the rear cover of the camera is curved. Consequently, when the rear cover is replaced with a new one and a new unexposed film is loaded, the camera can be reused.

The diameter of the aforementioned film magazine is different from that of a common film magazine (JIS K7528), and the outer diameter of the film magazine is 20.6 mm.

Therefore, the thickness of the camera can be reduced to about 24 mm, except for the thickness of a lens barrel portion. In this way, a very thin compact camera is realized.

A portion of the outer surface of the camera is covered with a carton 5 made of thick paper on which the brand name and the usage of the camera are printed.

Figure 2:
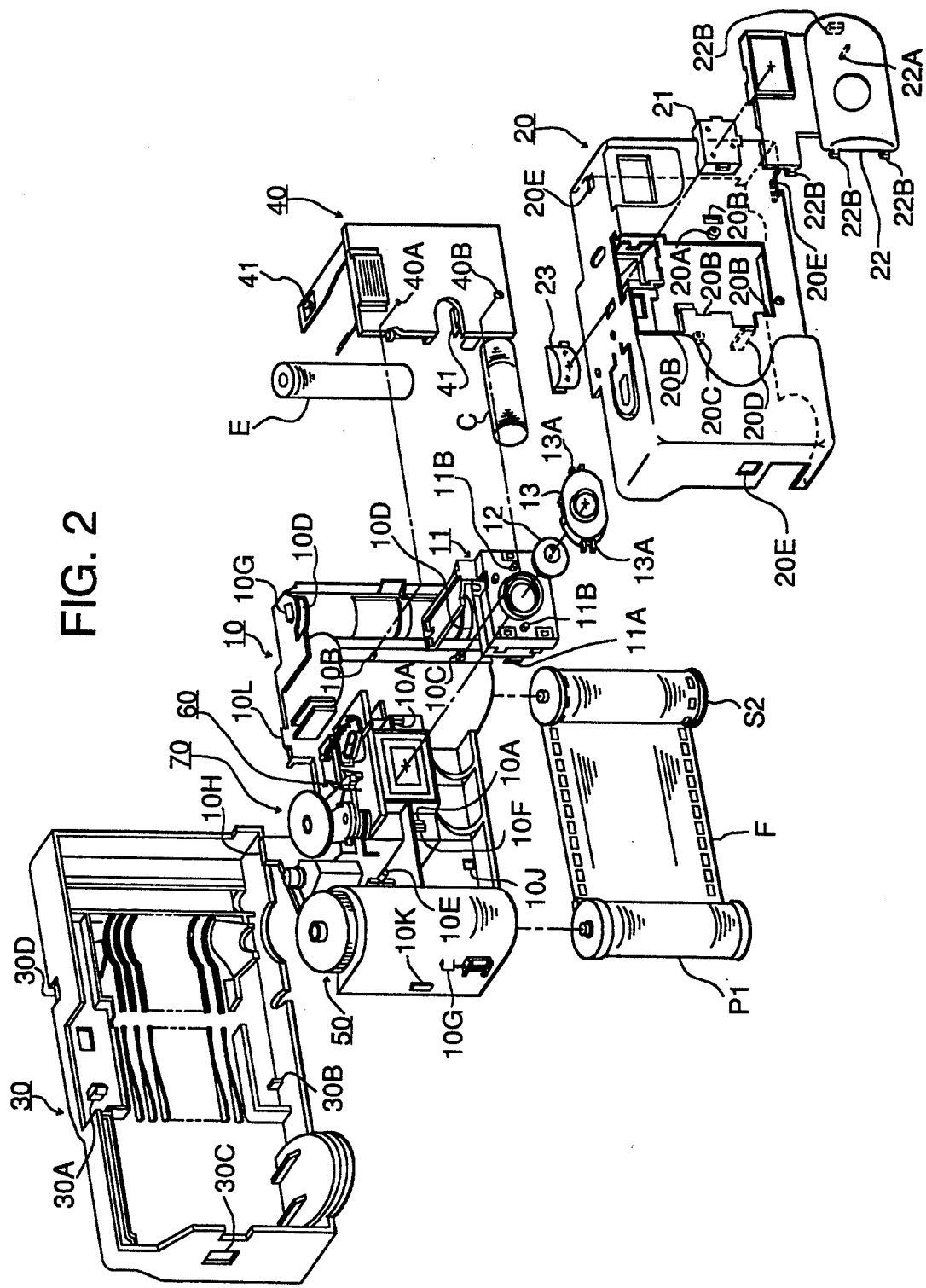
FIG. 2 is an exploded view showing a structure of the film unit with a photographic lens of the present invention.

FIG. 2 is a developed view showing the structure of the camera.

In FIG. 2, numeral 10 is a camera body, numeral 20 is a front cover, and numeral 30 is a rear cover. Numeral 40 is a strobe light unit installed in the camera, numeral 50 is a film winding mechanism, numeral 60 is a sector charge mechanism, and numeral 70 is a film counter mechanism.

The film winding mechanism 50, sector charge mechanism 60, and film counter mechanism 70 are assembled to the camera body 10, and further a shutter case accommodating the sector is assembled to the camera body 10.

The shutter case 11 is secured to the camera body 10 in such a manner that claws 11A protruding from both sides of the shutter case 11 are engaged with engaging portions 10A provided on the front of the camera body 10. Then, the sector is engaged with the sector charge mechanism 60.

Further, a single lens 12, the focal distance of which is f=30 mm and the diaphragm value of which is F9.5, is provided on the front of the shutter case 11. The single lens 12 is retained by a lens holder 13 having slots 13A engaged with guide pins 11B.

The camera body 10, shutter case 11, front cover 20, and rear cover 30 are made of black delustering plastic.

The strobe unit 40 is assembled to the camera body 10 so that holes 40A and 40B formed on the base plate are engaged with guide pins 10B and 10C provided on the front of the camera body 10.

Upper and lower battery holders 41 of the strobe unit 40 are inserted into upper and lower slits 10D of the camera body 10 so that the battery holders 41 are protruded into the battery chamber on the rear side of the camera body 10, and battery E, which is the electrical power source of the strobe unit, is held by the battery holders 41.

Capacitor C integrally provided to the strobe unit 40 is accommodated in a capacitor chamber formed in the lower portion of the shutter case 11.

When the front cover 20 is provided to the camera body 10, the assembly of the lens holder 13 and strobe unit 40 to the camera body 10 is completed.

Before the front cover 20 is provided to the camera body 10, an objective lens 21 of the viewfinder is set on the front of the front cover 20, and secured when a decorative cover 22 is engaged. A guide pin 22A is provided on the rear side of the decorative cover 22, and 4 claws 22B are protruded from the decorative cover 22. The guide pin 22A is engaged with a hole 20A formed on the front of the front cover 20, and the claws 22B are engaged with 4 engaging portions 20B.

An ocular 23 of the viewfinder is set at the rear of the front cover 20, and then the front cover is assembled onto the front of the camera body 10.

A hole 20C, claw 20D, and 3 engaging portions 20E are provided on the rear side of the front cover 20. The hole 20C engages with a guide pin 10E on the front of the camera body 10, the claw 20D engages with a claw 10F, and the engaging portions 20E engage with engaging portions 10G provided on the side of the camera body 10.

When the front cover 20 is engaged with the camera body 10, the lens holder 13 and the strobe light unit 40 are secured to the camera body 10.

Film magazine P1 and spool S2 with which the tip of unexposed film F is engaged, are respectively provided in a film magazine chamber 15A and a scroll chamber (a film winding chamber) 15B that are formed at the rear of the camera body 10 to which the front cover has been assembled.

The other end of film F is engaged with spool S1 provided in film magazine P1. Even after the film in the film magazine has been wound around spool S2, the film can be rewound around spool S1 because the other end of the film is engaged with spool S1, so that the film can be returned into film magazine P1 after the photographing operation has been completed.

After film F has been loaded into the camera body, a rear cover 30 is provided at the rear of the camera body 10, so that the camera body 10 can be shielded and the film surface can be maintained at a predetermined focal position.

Claws 30A and 30B are provided on the front of the rear cover 30, and holes 30C and 30D are provided on the side of the rear cover 30. In the case where the rear cover 30 is assembled to the camera body 10, the claws 30A and 30B are engaged with the engaging portions 10H and 10J of the camera body 10, and the holes 30C and 30D are engaged with the claws 10K and 10L of the camera body 10.

After the rear cover 30 has been provided to the camera body 10, a predetermined film winding operation is carried out so that the film is ready for photographing, and then the carton 5 shown in FIG. 1 is provided around the camera. In this way, assembly is completed.

The film winding mechanism 50, sector charge mechanism 60, and film counter mechanism 70 will be explained in detail as follows.

Figure 3:
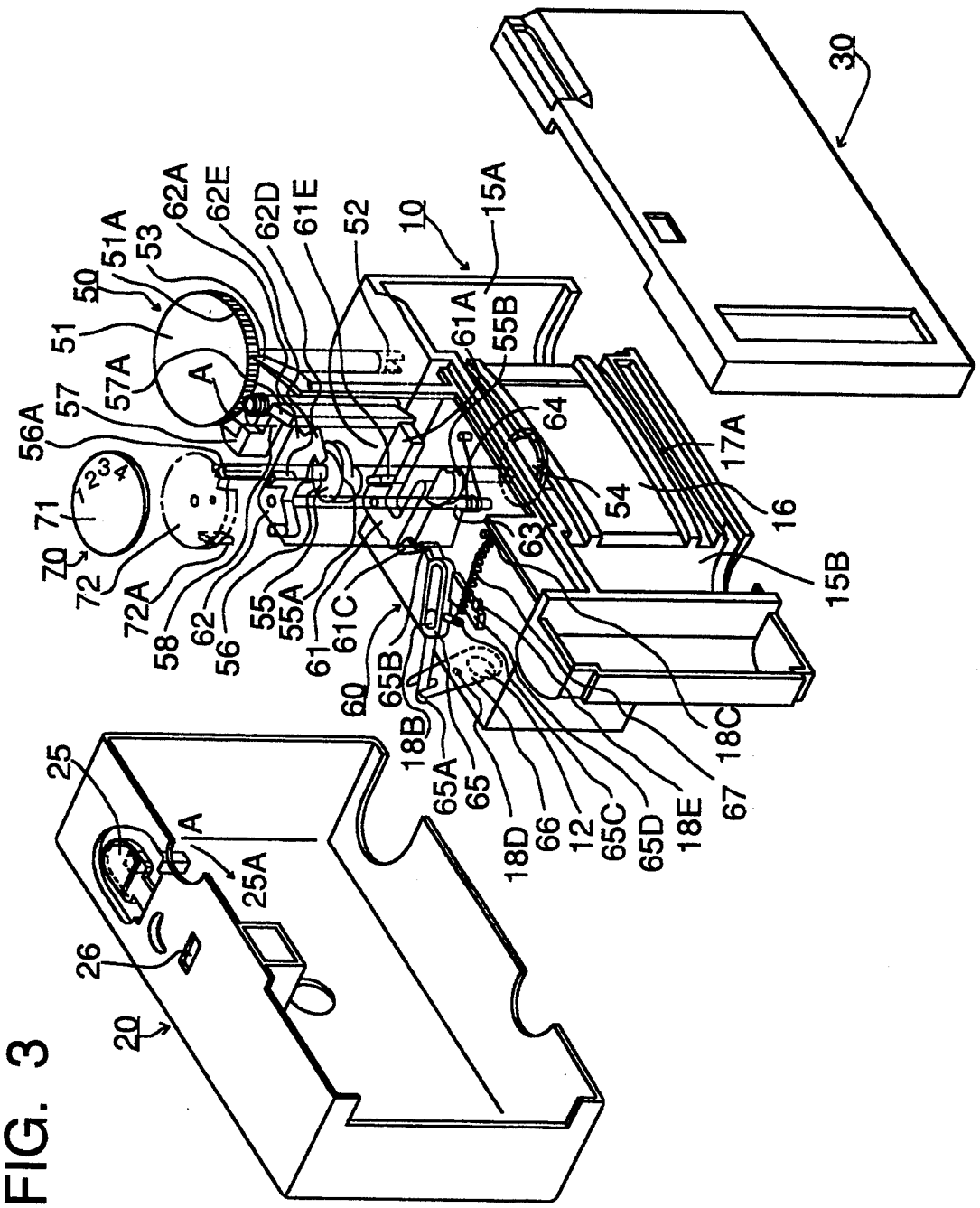
FIG. 3 is an exploded view showing a mechanism for shutter and film winding.
Figure 4:
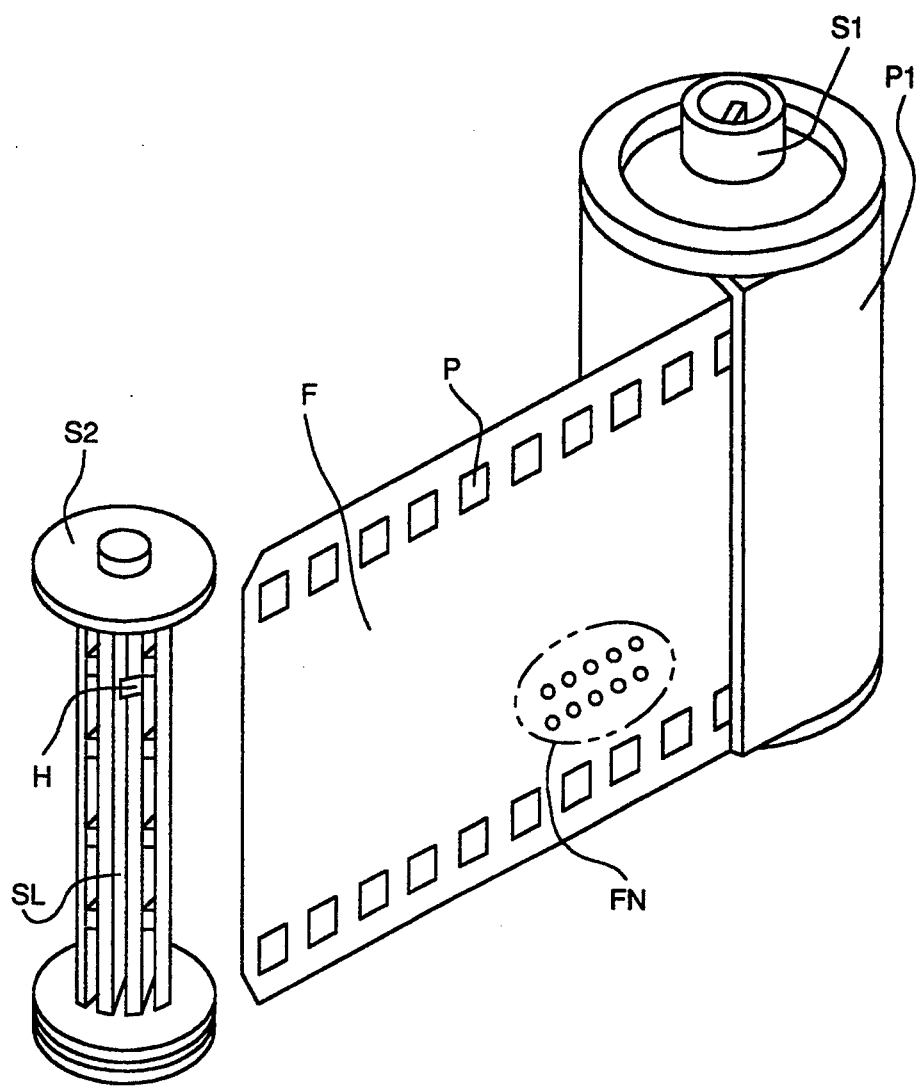
FIG. 4 is a view showing a film magazine and a film used for the present invention.

FIGS. 3 and 4 are rear views of the mechanisms.

In the camera body 10, the film magazine chamber 15A for film winding use and the scroll chamber 15B for film loading use are formed on either side of the image frame 16A that is an exposure section. J135 film F is loaded in film magazine P1 as shown in FIG. 4.

Film F used for the camera of this example is provided in the same manner as a regular film, in the following manner: a roll film of J135 or a slightly thinner roll film of 130 to 140 $\mu$m thick is accommodated in a film magazine in a dark room, wherein one end of the film is secured to spool S1 of film magazine P1, and a predetermined length of film is wound around spool S1, and the other end of the predetermined length is disposed outside of film magazine P1. The aforementioned film is loaded into the camera as follows.

Film magazine P1 is provided in film magazine chamber 15A so that spool S1 of film magazine P1 can be engaged with a fork 52 for winding. On the other hand, spool S2 is inserted into the scroll chamber 15B. Then, film F is pulled out until the tip of film notch FN agrees with a mark 17A located in the lower portion of the lower rail surface. After that, the tip of film F is inserted into slit SL of spool S2, and perforation P of film F is engaged with claw H.

Next, the rear cover is set so that the camera body can be shielded. The camera in the aforementioned condition is set at a film winding apparatus, and film F is wound around spool S2 in the scroll chamber 15B, without separating the other end of film F from spool S1 of the film magazine P1. Since film F is provided in the camera in the aforementioned manner, film F is wound into film magazine P1 each time a frame of film F is exposed. After a predetermined number of frames have been exposed, 2 frames of film are wound without being exposed. In the aforementioned manner, all the exposed film is wound into film magazine P1, wherein a necessary length of film end is left outside of film magazine P1 without being wound around spool S1. Consequently, this film magazine can be taken out from the camera in a bright room.

Next, the mechanism of the camera body will be explained as follows.

The camera body 10 is provided with essential mechanisms including the photographic lens 12, film winding mechanism 50, sector charge mechanism 60, and film counter mechanism 70.

First, the film winding mechanism and sector charge mechanism will be explained.

Numeral 51 is a film winding knob, and when the film winding knob 51 is rotated counterclockwise, film F can be wound. Perforations P of film F are engaged with a sprocket wheel 54, the number of teeth of which is 8. The sprocket wheel 54 and a cam 55 having a semicircular cam portion 55B, are mounted on the same shaft, and the cam 55 is rotated counterclockwise by one revolution when the film is wound.

That is, the film is wound by one frame, and the length of one frame is the same as that of 8 perforations, the same as that of teeth of the sprocket wheel. In this case, the dimensions of the frame are 24×36 mm.

As the cam 55 is rotated counterclockwise, the semicircular cam portion 55B is also rotated counterclockwise. In the aforementioned process, a charge lever 61 is rotated clockwise by the semicircular cam portion 55B, resisting the force of a charge lever spring 64 that pushes the charge lever 61 counterclockwise around a charge lever shaft 63. Therefore, a triangular push member 61C mounted on the charge lever 61 pushes a rising portion 65B of the sector lever 65, and then the triangular push member 61C gets over the rising portion 65B, so that the sector charge mechanism is charged as shown in the drawing.

A sector spring 67 is provided between a pin 65C of the sector lever 65 and a pin 18C mounted on the camera body 10. By the tensile force of the sector spring 67, a pin 18B that slidably guides a long hole of the sector lever 65 is contacted with the left end of the long hole. Therefore, an arm plate 65D mounted on the sector lever 65 comes into contact with a pin 18E mounted on the camera body 10. A sector drive pin 65A that drives a sector 66 rotatably pivoted by a sector pin 18D mounted on the camera body 10, is inserted into a fork portion of the sector 66.

As described later, a protrusion 62D of a cam stopper 62 is disengaged from a groove 55A of the cam 55. An arm portion 57A of a winding stopper 57 is moved from the position illustrated in the drawing and disengaged from the edge portion of an arm 61A of a charge lever 61 and also from the edge portion of an arm 62A of a cam stopper 62. Therefore, the arm portion 57A of the winding stopper 57 is brought into contact with the edge surface of the arm portion 61A by the force of a winding stopper spring 58 that pushes clockwise. When the film is wound, the cam 55 is rotated by one revolution, and the groove portion 55A of the cam 55 is returned to the initial position. Then, the protruded portion 62D of the cam stopper 62 is forced to jump into the groove portion 55A by the spring force that pushes the cam stopper 62 clockwise by a horizontal tip portion of the charge lever spring 64, Due to the aforementioned jumping motion, the arm portion 57A of the winding stopper 57 that has been engaged on the edge surface of the arm portion 62A of the cam stopper 62, is disengaged.

The outer circumferential cylindrical surface of the film winding knob 51 is formed into a ratchet wheel. When the aforementioned engagement is released, a V-shaped protrusion of the tip of the winding stopper 57 jumps into the tooth groove of the ratchet wheel 51A by the action of the force of the winding stopper spring 58. Therefore, the film winding knob 51 is prevented from being rotated counterclockwise. That is, when the film winding operation has been completed, the film winding knob 51 can not be rotated any more.

The camera body 10 is provided with a claw 53 made of resilient resin, to prevent reverse rotation, and the claw 53 comes into pressure contact with the ratchet wheel 51A so that the film winding knob 51 is prevented from reverse rotation.

When a release button 25 provided on the front cover 20 is pressed, a tip of a pin 25A provided at the rear of the release button 25 is moved in the direction indicated by arrow A in the drawing. That is, when the front cover 20 is assembled to the camera body 10, the tip of the release pin 25A is moved in the direction indicated by arrow A shown on the winding knob 51, so that the winding stopper 57 is rotated counterclockwise, resisting the force of the winding stopper spring 58. Then, the edge of the arm 61A of the charge lever 61 is disengaged from the edge surface of the arm 57A of the winding stopper 57, and the charge lever 61 is rotated counterclockwise, in other words, the cam stopper 62 is rotated counterclockwise by the force of the charge lever spring 64.

When the charge lever 61 is rotated counterclockwise, the push member 61C of the charge lever 61 pushes the raised portion 65B of the sector lever 65 and gets over the raised portion 65B. Accordingly, the sector lever 65 is rotated clockwise around the pin 18B provided in the long hole of the sector lever, resisting the tensile force of the sector spring 67. After that, the sector lever 65 is returned by the tensile force of the sector spring 67. Consequently, the sector drive pin 65A is closed after the sector 66 has been rotated around the sector pin 18D so as to expose the film.

The cam stopper 62 is rotated counterclockwise together with the charge lever 61 in the manner described before, and the protrusion 62D of the cam stopper 62 is disengaged from the groove portion 55A of the cam 55. Even after the operation for pressing the release button has been stopped, the arm 57A of the winding stopper 57 is pushed clockwise by the force of the winding stopper spring 58. However, the arm 57A is blocked by the edge surface of the arm 61A of the charge lever 61, and the V-shaped protrusion of the tip of the winding stopper 57 is not engaged with the ratchet wheel 51A of the winding knob 51. Therefore, the next film winding operation can be carried out.

Next, the film counter mechanism will be explained as follows.

Numeral 72 is an index gear that engages with a V-shaped groove 56A provided at the tip of the cam shaft 56 mounted on the cam 55 rotated integrally with the sprocket wheel 54. Each time the film is wound by one frame and the cam shaft 56 is rotated by one revolution, the index wheel 72 is rotated clockwise by one tooth.

An index plate 71 is printed as an integrally molded part on the upper surface of the index wheel 72, so that the number of frames exposed is displayed in a counter window 26 formed on the upper surface of the front cover 20.

A projection 72A is provided on the lower surface of the index wheel 72. When a film winding operation is carried out after a predetermined number of frames have been exposed, the projection 72A is inserted between the protrusion 61E of the charge lever 61 and the protrusion 62E of the cam stopper 62. When the projection 72A is inserted between both protrusions 61E and 62E, the film is wound by one frame. Therefore, even after the cam 55 has been rotated by one revolution and the sector charge has been completed, the aforementioned protrusions 61E and 62E are blocked by the projection 72A of the index wheel 72, so that the charge lever 61 can not be operated, and the protrusion 62D of the cam stopper 62 can not be engaged with the groove portion 55A of the cam 55. The arm 57A of the winding stopper 57 comes into contact with the edge surface of the arm 62A of the cam stopper 62 by the force of the winding stopper spring 58. Therefore, the V-shaped protrusion of the tip of the winding stopper 57 is not engaged with the ratchet wheel 51A, and the charge lever 61 can not be operated to open and close the sector, so that the film can not be exposed.

When a film winding operation of 2 frames is carried out in the manner described above, the index wheel 72 is rotated by an angle corresponding to 2 teeth, so that the projection 72A of the index wheel 72 keeps holding the protrusions 61E, and the charge lever 61 is blocked. However, the projection 72A is disengaged from the protrusion 62E of the cam stopper 62. Accordingly, the protrusion 62D is engaged with the groove 55A of the cam 55, so that the engagement of the winding stopper 57 is released, and the winding knob 51 is engaged with the winding stopper 57. Therefore, it becomes impossible to wind the film. As described before, the charge lever 61 is blocked, so that the film can not be exposed. In the manner described above, the end of the film is prevented from being wound into the film magazine.

In the film unit with a photographic lens of the present invention, a plurality of small holes having a diameter of about 2.5 mm are provided in the front cover 20 and the decorative cover 22, pins for function checking are inserted into the small holes, and the tips of the pins are contacted with checking terminals of a printed circuit board provided to the front surface of a strobe unit 40, disposed just behind the small holes. Thereby, various functions can be checked and charging of a battery E from an outside power source can be performed.

Figure 5:
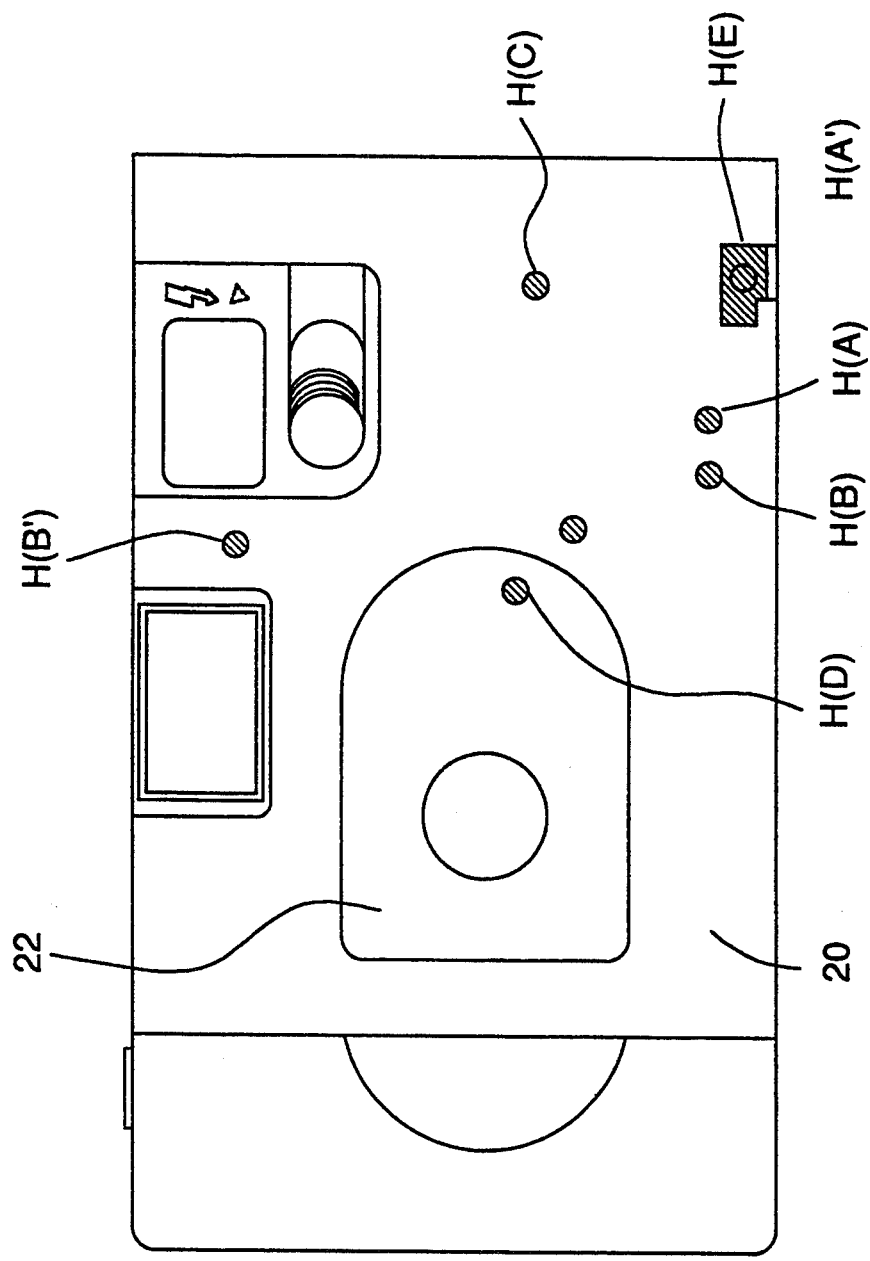
FIG. 5 is a front view showing a front cover and a decorative cover.
Figure 6:
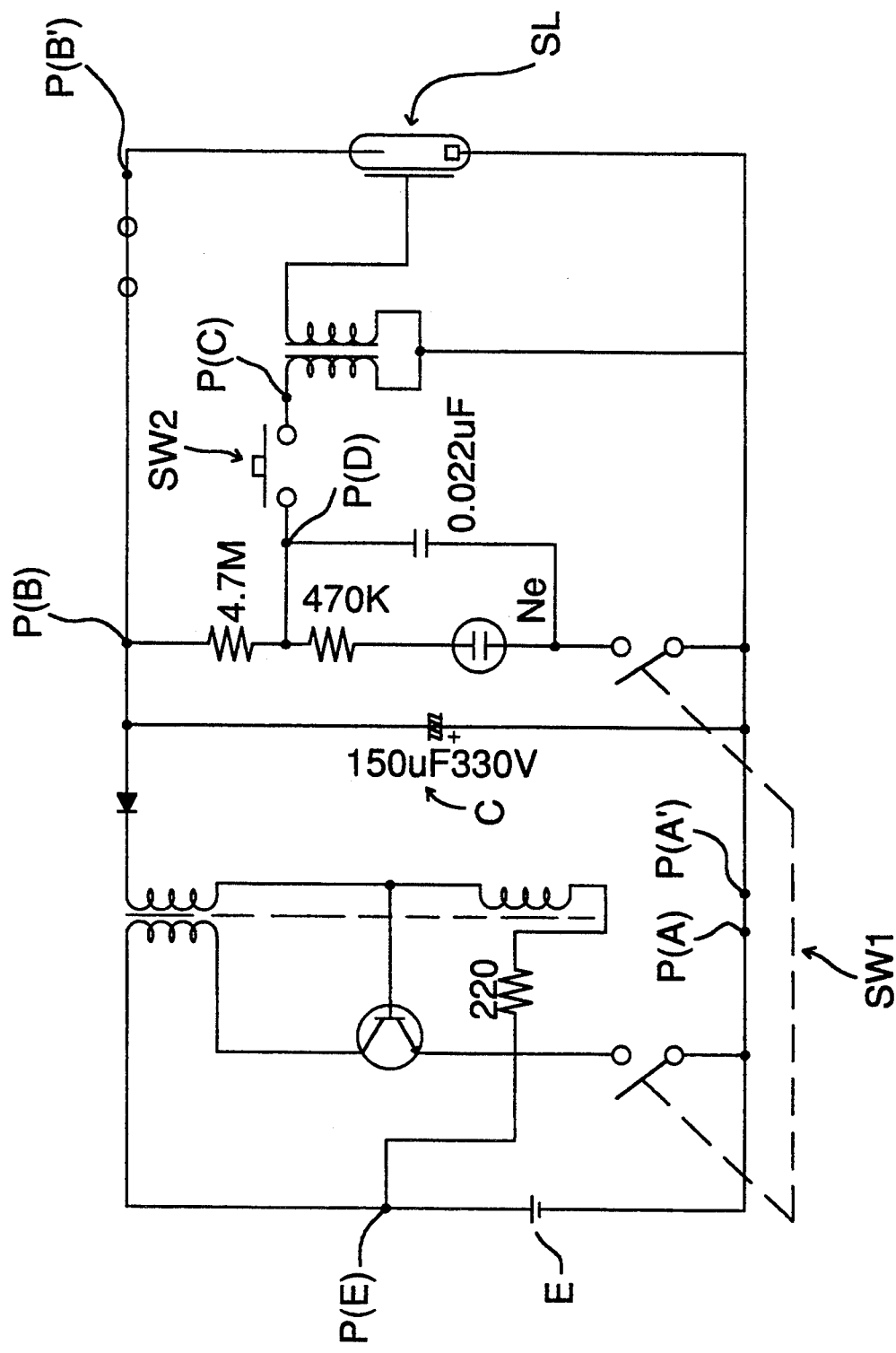
FIG. 6 is a circuit diagram of a strobe unit.

FIG. 5 is a front view showing the front cover 20 and the decorative cover 22, in which H(A), H(A'), H(B), H(B'), H(C), H(D), and H(E) are small holes provided for checking. FIG. 6 shows a circuit diagram of the strobe unit provided on a printed circuit board in the example, in which E is a battery, C is a main capacitor, and SL is a strobe light emission tube. Further, SW1 is a change-over switch for the strobe unit, and when switch SW1 is turned on, output voltage of the battery E is increased, and the main capacitor C is charged thereby. When the voltage of the main capacitor C is more than a predetermined voltage, a neon lamp Ne glows, and displays that photographing using strobe light can be performed.

SW2 is a trigger switch provided in a trigger circuit, which is synchronously moved with a sector 66, which is a shutter blade, and when the shutter blade is fully opened, the trigger switch SW2 is turned on. When the trigger switch SW2 is turned on, the trigger circuit is operated and thereby the strobe light emission tube SL emits light.

Checking terminals P(A), P(A'), P(B), P(B'), P(C), P(D), and P(E) are provided on the circuit board, and conductive metallic portions each having a diameter of about 2.5 mm, which are checking terminals, are positioned on the printed circuit board to correspond with, at a slight distance from, holes H(A), H(A'), H(B), H(B'), H(C), H(D), and H(E).

In the camera in which the strobe function can be checked, the small holes are covered with the carton, 5 and is therefore dust-proof, and does not have an unsightly appearance. Further, the holes are so small that a user can not make contact with the terminals even when the carton is removed from the camera, and is therefore completely safe.

When checking the strobe unit, the carton is removed, and the following checking and charging operations can be performed by inserting pins of a tester for function checking provided separately from the camera, into the holes.

(a) Terminals P(A) or (PA') and P(B) or P(B'), checking the charging voltage of the main capacitor discharging of the main capacitor forced charging of the main capacitor (without using a transformer)

(b) Terminals P(C) and P(D), (under the condition that the strobe change-over switch SW1 is turned on) emission checking for the strobe emission tube SL (together with function checking of a trigger coil)

(c) Terminals P(A) or P(A'), and P(E) voltage checking of the battery capacitor charging with an outside power source (through a step-up transformer) charging the battery E when the battery is a secondary battery (exp Ni—Cd).

Although a strobe unit is provided to the camera in the example, the example can also be applied to a camera without a strobe unit, or a camera having a battery in order to operate other functions, and they are within the scope of the present invention. Further, the present invention can be applied to not only checking whether the camera can be reused or not, but also confirmation of the emission characteristics of the strobe unit during a first assembling operation, or for checking the charging speed of the strobe unit.

As described above, holes into which checking pins are inserted for checking the strobe function are provided to a camera with a strobe unit in the example, and there is no possibility of an electric shock even when the hand of the user comes into contact with the holes. However, when a metallic pin or the like is intentionally inserted into the holes, there is a possibility of an electric shock depending on the condition. Therefore, it is preferable that these holes are covered by adhering seals (paper, hard paper, resin coated sheets, thin plastic) on the holes, and it is preferable that a warning, for example, 'Beware of electric shock, do not peel seals' is provided on the seals.

When checking, these seals are peeled, and new seals are adhered for reuse of the camera.

When a number or colors corresponding to the number of times of reuse is displayed on the seals, the number of times of reuse is easily judged after the film unit with a photographic lens has been collected.

According to the present invention, it is not necessary that the entire body of a camera is disassembled, and the camera can be reused as it is. That is, it is not necessary that the film unit with a photographic lens is disassembled, the strobe unit is removed from the film unit and tested, and assembled again. Function checking of the strobe unit or checking of the consumed degree of a battery can be performed under the condition that the strobe unit is provided to the camera. Therefore, the number of parts, such as batteries, which need to be replaced, can be decreased, and the time required for checking during the quality assurance can be decreased. Further, charging from an outside power source is possible, and the battery can be used without being discarded.

When an inspection means, in which a plurality of the checking pins are provided corresponding to positions of the small holes, is contacted with a plurality of checking terminals from the front side of a camera body, a plurality of inspections can be carried out. In this case, especially, when the camera is checked for re-use, this inspection means can greatly contribute to automatic inspection of the function of the strobe circuit of the collected camera, in place of manual checking. The inspection items of the strobe circuit are generally plural, and therefore, the numbers of checking pins of the inspection means are preferably more than three.

When the inspection is carried out by making a current flow in an inspection circuit, a protective resistor is inserted into the inspection circuit so that excessive current does not flow in the circuit. When a plurality of checking terminals of the inspection means are contacted with inspected terminals of the camera body, the contacting order of checking terminals with the inspected terminals may be determined depending on voltage of the inspected terminals in order to prevent noises from entering into the circuit. The length of the pins may be lengthened so that, for example, a ground terminal and a power terminal can be contacted with the inspected terminals before other checking terminals. Further, the following embodiment can also be applied in order to prevent noises or erroneous inspections, in which: springiness is given to the terminals; or conductive rubber material is provided on the ends of the terminals.

Although the inspection itself is completed in a short time, vibration is preferably prevented during the inspection. Accordingly, it is preferable to consider the diameter of a hole of the camera body corresponding to the inspected terminal, and the shape of the pin which is contacted with the hole.

Further, the present invention is not limited to the purpose of inspection, but the present invention can also be applied for the purposes of discharging excess electric charges, and re-charging. However, in order to prevent confusion, the layout of checking terminals may be changed, and it may also be allowed that each terminal does not have interchangeability with other terminals.

What is claimed is:

1. A film unit including a picture-taking lens through which a subject is photographed on an unexposed film, comprising:
    a shutter mechanism to open or close an aperture for the picture-taking lens;
    a release button to actuate said shutter mechanism so as to open the aperture for the picture-taking lens;
    a strobe to irradiate the subject with light;
    an electrical circuit electrically coupled to the strobe to supply electric power thereto;
    a trigger switch mechanically linked with said shutter mechanism and electrically coupled to said electrical circuit so that the strobe is triggered when said shutter mechanism opens the aperture for the picture-taking lens;
    a pair of terminals in said electrical circuit electrically coupled to both sides of said trigger switch, respectively; and
    a film unit body on which holes corresponding in position to said pair of terminals are provided so that said trigger switch can be by-passed with a by-pass line in contact with the pair of terminals through said holes, whereby the strobe can be triggered without actuating the shutter mechanism.

2. A method of checking a film unit which includes a picture-taking lens through which a subject is photographed on an unexposed film, a strobe to irradiate the subject with light, an electrical circuit to supply electric power to the strobe, a trigger switch to trigger the strobe, by-pass terminals to by-pass the trigger switch, and a film unit body on which holes corresponding in position to the by-pass terminals are provided, comprising the steps of:
    inserting ends of a by-pass line through said holes, respectively, and
    engaging said ends of the by-pass line with the by-pass terminals so as to enable triggering of the strobe to emit light.

* * * * *